US010613855B2

United States Patent
Moustafa et al.

(10) Patent No.: US 10,613,855 B2
(45) Date of Patent: Apr. 7, 2020

(54) PLATFORM-INDEPENDENT USER-DEFINED FUNCTIONS FOR DATA ACCESS

(71) Applicant: Microsoft Technology Licensing, LLC, Redmond, WA (US)

(72) Inventors: Walaa Eldin M. Moustafa, Santa Clara, CA (US); Ratandeep S. Ratti, Sunnyvale, CA (US); Maneesh Varshney, San Jose, CA (US); Carl W. Steinbach, Berkeley, CA (US); Adwait N. Tumbde, Sunnyvale, CA (US); Khai Quang Tran, San Mateo, CA (US); Vasanth Rajamani, Burlingame, CA (US); Suja Viswesan, San Jose, CA (US); Shrikanth Shankar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 15/973,367

(22) Filed: May 7, 2018

(65) Prior Publication Data
US 2019/0339969 A1    Nov. 7, 2019

(51) Int. Cl.
| G06F 9/44 | (2018.01) |
| G06F 8/76 | (2018.01) |
| G06F 8/36 | (2018.01) |
| G06F 16/25 | (2019.01) |

(52) U.S. Cl.
CPC .................. *G06F 8/76* (2013.01); *G06F 8/36* (2013.01); *G06F 16/258* (2019.01)

(58) Field of Classification Search
CPC ........................................................ G06F 8/76
USPC ........................................................ 717/107
See application file for complete search history.

(56) References Cited

U.S. PATENT DOCUMENTS

2012/0191732 A1* 7/2012 George ................. G06F 16/283
707/755

* cited by examiner

*Primary Examiner* — Wei Y Zhen
*Assistant Examiner* — Lanny N Ung
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a user-defined function (UDF) that is defined using a standard UDF interface for accessing multiple platforms. Next, the system converts data in a platform into a standard form that is supported by the standard UDF interface using a platform-specific wrapper for the UDF and a platform-specific implementation of the standard UDF interface. The system then generates output data in the standard form by applying one or more operations to the data in the standard form. Finally, the system converts the output data into a platform-specific form that is supported by the platform and returns the output data in the platform-specific form.

20 Claims, 4 Drawing Sheets

PLATFORM-INDEPENDENT USER-DEFINED FUNCTIONS FOR DATA ACCESS

BACKGROUND

Field

The disclosed embodiments relate to user-defined functions (UDF) for accessing data. More specifically, the disclosed embodiments relate to techniques for implementing platform-independent UDFs for data access.

Related Art

User-defined functions (UDFs) are commonly used with relational databases, data warehouses, data query platforms, and/or data-processing systems to manipulate data in a way that is not supported by conventional relational operators. For example, a UDF may be created and executed to extract and/or transform rows and/or columns of data from a data store before the data is outputted and/or further processed.

On the other hand, data processing tasks are frequently performed using multiple databases, data-processing systems, and/or data query platforms. Because each platform includes a different internal data representation and/or application programming interface (API) for defining UDFs, a given UDF may require manual reimplementation on each platform in which use of the UDF is desired or needed, which in turn may increase costs and/or overhead associated with data application development and/or maintenance.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

Figure 1:
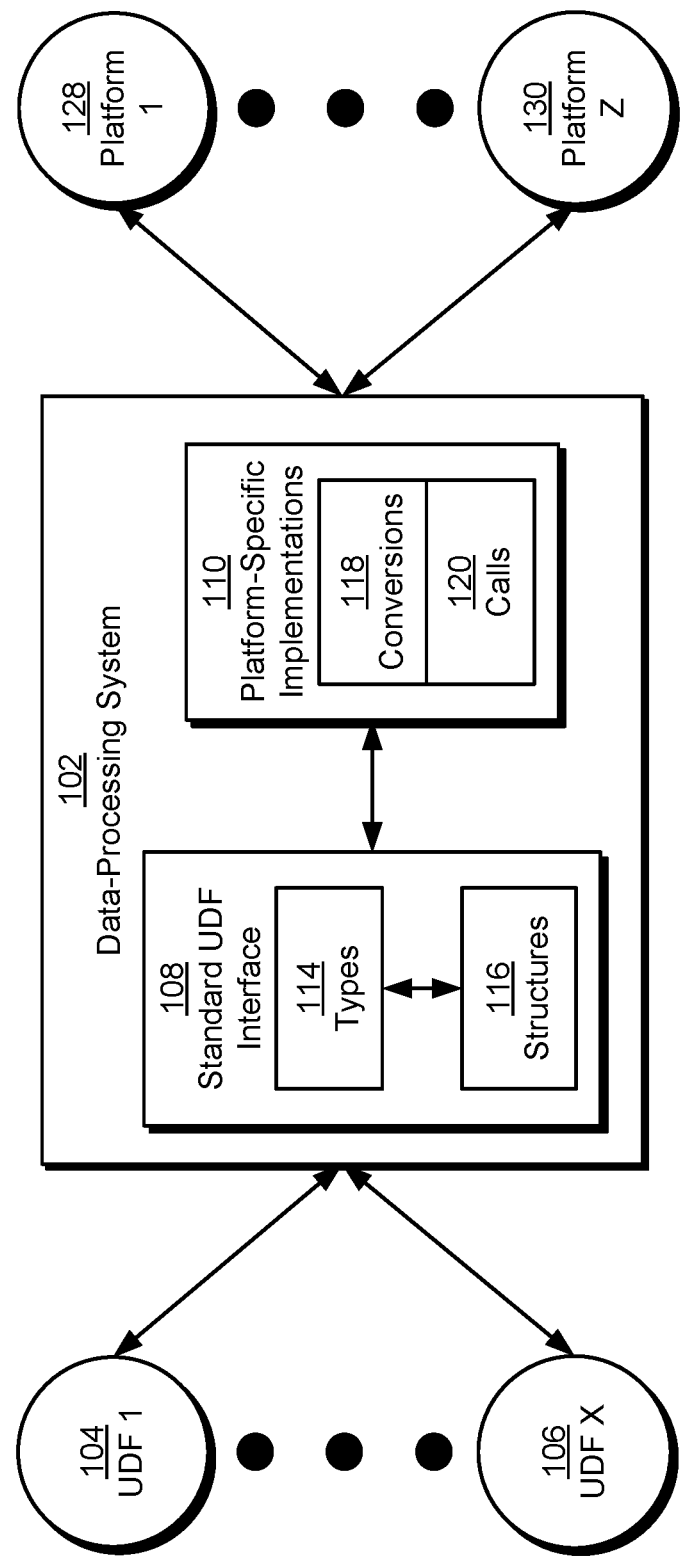
FIG. 1 shows a schematic of a system in accordance with the disclosed embodiments.

The disclosed embodiments provide a method, apparatus, and system for processing data. As shown in FIG. 1, the system includes a data-processing system 102 that uses a set of user-defined functions (UDFs) (e.g., UDF 1 104, UDF x 106) to access and/or manipulate data on one or more platforms (e.g., platform 1 128, platform z 130). The platforms may include a relational database, data warehouse, data query engine, data-processing pipeline, and/or other type of module or system for querying, processing, and/or analyzing data.

The UDFs may include custom functions that are used to perform operations and/or transformations on data in the platforms, independently or in addition to built-in functionality provided by each platform. For example, a platform may support querying of data using Structured Query Language (SQL) and/or other types of relational operators. The platform may also provide a set of built-in functions for manipulating strings, dates, and/or other types of data stored in or accessed using the platform. The platform may further support the creation of UDFs for performing more complex operations by providing an interface (e.g., application-programming interface (API)) that allows the UDFs to be written in an imperative language and called using conventional queries and/or operations within the platform.

Those skilled in the art will appreciate that each platform may have a different internal representation of data and/or provide a different API for defining and/or using UDFs. For example, a Presto SQL query engine may use a data type called "Block" to represent container types such as arrays, maps, and structs. The Presto engine may also use annotations and directories to obtain "scalar" and "aggregation" UDFs from users. On the other hand, an Apache Hive data warehouse may provide an interface named "UDF" for defining UDFs that manipulate primitive types and a different interface named "GenericUDF" for defining UDFs that manipulate non-primitive types such as arrays, maps, and structs. The "GenericUDF" interface may additionally use Hive-specific "ObjectInspector" and "Object" types to store and access data using the non-primitive types. As a result, the logic of a given UDF may require manual re-implementation to conform to the data structures and/or interfaces on every platform with which the UDF is used.

In one or more embodiments, data-processing system 102 includes functionality to support and/or provide platform-independent UDFs for accessing and/or manipulating data. In particular, data-processing system 102 provides a standard UDF interface 108 for defining the UDFs. Standard UDF interface 108 includes a set of standard types 114 and structures 116 for storing and/or accessing data. For example, types 114 may represent platform-independent abstractions of data types such as integers, Booleans, longs, arrays, maps, and/or structs. Structures 116 may represent platform-independent abstractions of data objects represented by types 114. As a result, structures 116 may be used to store and manipulate data of the corresponding types, while types 114 may be used to obtain schemas for the structures (e.g., key and value types within a map data object).

Data-processing system 102 also includes a set of platform-specific implementations 110 associated with standard UDF interface 108. For example, platform-specific implementations 110 may be used to access platform-specific data and/or objects using types 114 and structures 116 declared using standard UDF interface 108. Platform-specific implementations 110 may also perform conversions 118 between native objects supported by the platforms and types 114 and structures 116 in standard UDF interface 108. Platform-specific implementations 110 may further execute calls 120 to the corresponding UDFs to apply the UDFs to the data once the relevant data conversions 118 have been made.

Figure 2:
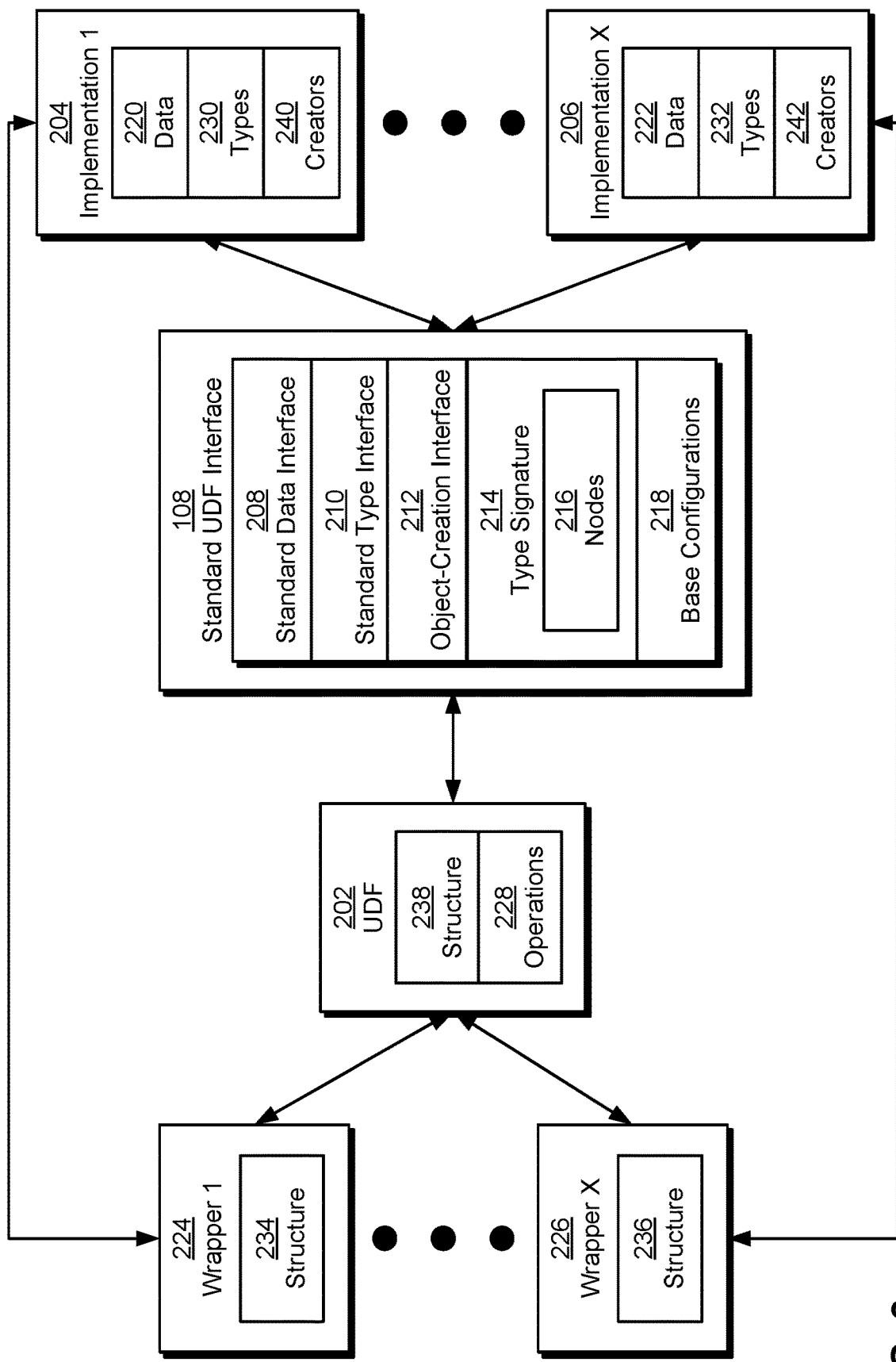
FIG. 2 shows a system for processing data in accordance with the disclosed embodiments.

As shown in FIG. 2, a system for processing data (e.g., data-processing system 102 of FIG. 1) provides, within standard UDF interface 108, a standard data interface 208, a standard type interface 210, an object-creation interface 212, and a type signature 214. As mentioned above, one or more users may define a UDF 202 using standard UDF interface 108 and use UDF 202 to perform complex operations and/or implement custom functionality on top of relational operators and/or built-in functions provided by the platforms.

In one or more embodiments, standard UDF interface 108 allows a structure 238 of data and/or operations 228 on the data in UDF 202 to be defined in a platform-agnostic way. As a result, standard UDF interface 108 may include an abstraction of types and data that are used with UDFs on each platform. Within standard UDF interface 108, standard data interface 208 represents standard data objects that can be created, accessed, and manipulated using standard UDF interface 108, and standard type interface 210 represents standard data types in standard UDF interface 108. Standard data interface 208 may be extended by a set of interfaces for accessing the standard data objects, and standard type interface 210 may be extended by a set of interfaces for accessing schemas associated with the standard data objects.

As a result, standard data interface 208 may include the following example representation:

```
public interface StdData {
    StdType getType( );
    Object getUnderlyingData( );
}
```

The representation above includes an interface with a name of "StdData" and two methods inside the interface. A first method named "getType" is used to obtain a standard data type of a data object implementing the interface, and a second method named "getUnderlyingData" is used to obtain data stored in the object. The "getType" method may be used when the actual type of the data is known at runtime and/or to retrieve element types of container types such as arrays, maps, and structs.

The "StdData" interface may be extended by a number of type-specific interfaces. For example, interfaces such as "StdInteger," "StdLong," "StdBoolean," "StdMap," and "StdStruct" may be created to represent standardized versions of respective SQL types of integer, long, boolean, array, map, and struct. Each interface may extend the "StdData" interface and expose additional operations to manipulate the corresponding data object.

For example, an interface for a standard map object may include the following representation:

```
public interface StdMap extends StdData {
    int size( );
    StdData get(StdData key);
    void put(StdData key, StdData value);
    Set<StdData> keySet( );
    Collection<StdData> values( );
}
```

The interface above has a name of "StdMap" and extends the "StdData" interface. The interface also includes a set of methods for using and/or manipulating the standard map object. A "size" method may provide the size of the standard map as an integer, a "get" method may retrieve a value associated with a "key" in the object, and a "put" method may write a key-value pair to the object. A "keySet" method may obtain a set of keys stored in the object, and a "values" method may obtain a set of values stored in the object.

In another example, an interface for a standard struct object may include the following representation:

```
public interface StdStruct extends StdData {
    StdData getField(int index);
    StdData getField(String name);
    void setField(int index, StdData value);
    void setField(String name, StdData value);
    List<StdData> getFields( );
}
```

The interface above has a name of "StdStruct" and extends the "StdData" interface. The representation also includes a set of methods for using and/or manipulating a standard struct object. Two "getField" methods are used to retrieve fields in the object by name or index, and two "setField" methods are used to write to fields in the object by name or index. A "getFields" method is used to retrieve a list of all fields in the object.

In turn, standard type interface 210 may include the following representation:

```
public interface StdType {
    Object getUnderlyingType( );
}
```

The above representation indicates that the interface has a name of "StdType" and one method named "getUnderlyingType." The method may be used to retrieve an underlying standard and/or platform-specific data type for an implementation of the interface.

Like the "StdData" interface, the "StdType" interface may be extended by a set of type-specific interfaces. For example, sub-interfaces of the "StdType" interface may include "StdIntegerType," "StdBooleanType," "StdLongType," "StdArrayType," "StdMapInterface," and "StdStructInterface." Each sub-interface may further define methods that are specific to the corresponding type.

For example, an interface for a standard map type may include the following representation:

```
public interface StdMapType extends StdType {
    StdType keyType( );
    StdType valueType( );
}
```

The interface above has a name of "StdMapType" and extends the "StdType" interface. The interface also includes two methods named "keyType" and "valueType." The "keyType" method may be used to obtain a standard type representing the key type of keys in a standard map, and the "valueType" method may be used to obtain a standard type representing the value type of values in the standard map.

The system additionally includes platform-specific implementations (e.g., implementation 1 204, implementation x 206) of standard data interface 208, standard type interface 210, and/or sub-interfaces of standard data interface 208 and/or standard type interface 210. The platform-specific implementations may be used to manipulate native, platform-specific data 220-222 and types 230-232 represented by standard objects and types in standard UDF interface 108. Consequently, the platform-specific implementations may allow users to implement UDFs (e.g., UDF 202) against a uniform type system independently of the underlying platform-specific implementation details.

For example, an Apache Hive implementation of the "StdMap" interface described above may include the following representation:

```
public class HiveMap implements StdMap {
    final Object _object;
    final MapObjectInspector _mapObjectInspector;
    @Override
    public Set<StdData> keySet( ) {
        return new AbstractSet<StdData>( ) {
            @Override
            public Iterator<StdData> iterator( ) {
                return new Iterator<StdData>( ) {
                    Iterator mapKeyIterator =
                        _mapObjectInspector.getMap(_object).keySet( ).iterator( );
                    @Override
                    public boolean hasNext( ) {
                        return mapKeyIterator.hasNext( );
                    }
                    @Override
                    public StdData next( ) {
                        return HiveWrapper.createStdData(mapKeyIterator.next( ),
                            _mapObjectInspector.getMapKeyObjectInspector( ));
                    }
                };
            }
            @Override
            public int size( ) {
                return HiveMap.this.size( );
            }
        };
    }
}
```

The implementation above includes a class with a name of "HiveMap" that implements the "StdMap interface. Within the class, the "keySet" method uses a Hive-specific "MapObjectInspector" object to interact with a map, obtain a set of keys in the map, and return the set of keys in a "Set" of "StdData."

In another example, a Presto implementation of the "StdMap" interface may include the following representation:

```
public class PrestoMap implements StdMap {
    Block _block;
    final MapType _mapType;
    final MethodHandle _keyEqualsMethod;
    final Platform _platform;
    public Set<StdData> keySet( ) {
        return new AbstractSet<StdData>( ) {
            @Override
            public Iterator<StdData> iterator( ) {
                return new Iterator<StdData>( ) {
                    int i = -2;
                    @Override
                    public boolean hasNext( ) {
                        return !(i + 2 == size( ) * 2);
                    }
                    @Override
                    public StdData next( ) {
                        i += 2;
                        Type keyType = _mapType.getKeyType( );
                        return PrestoWrapper.createStdData(readNativeValue
                            (keyType,_block, i), keyType, _platform);
                    }
                };
            }
            @Override
            public int size( ) {
                return PrestoMap.this.size( );
            }
        };
    }
}
```

The implementation above includes a class with a name of "PrestoMap" that implements the "StdMap" interface. Within the class, the "keySet" method uses Presto-specific "MapType" and "Block" objects to access a set of keys in a map and return the set of keys in a "Set" of "StdData."

Standard UDF interface 108 also supports the use and verification of type signatures 214 for UDF 202. For example, standard UDF interface 108 may allow a creator and/or other user associated with UDF 202 to provide a string representation of type signature 214 for UDF 202. Standard UDF interface 108 may convert the string into a set of nodes 216 in a tree structure. In the tree structure, each node may represent a concrete type (e.g., a type that cannot be parameterized), a generic type (e.g., a type parameter that is resolved during instantiation of a parametric type containing the type parameter), a parametric type (e.g., a type that is parameterized using one or more other types), and/or a non-parametric type (e.g., a type that is not parameterized using one or more other types). Base types may include parametric types in intermediate nodes 216 of the tree structure and non-parametric types in leaf nodes 216 of the tree structure. The base types may be concrete or generic, and generic types may be required to be non-parametric. For example, a type declaration of "public class Foo<T>" may have a parametric concrete type of "Foo" and a non-parametric generic type of "T."

As a result, a string of "map(array(boolean), K)" may be converted into four nodes 216 in a corresponding tree-based type signature 214. The root node includes a concrete parametric base type of "map" and two child nodes. One child node has a concrete parametric base type of "array," and the other child node has a generic, nonparametric base type of "K." The fourth node in type signature 214 is a child node of the "array" node and has a concrete, nonparametric base type of "boolean." Because type signature 214 encodes the structure and/or base types of input and/or output of UDF 202, the system may translate type signature 214 into a platform-specific representation to execute and/or use UDF 202 in the corresponding platform.

Object-creation interface 212 provides an abstraction for creating standard objects with standard types using standard UDF interface 108. Methods exposed by object-creation interface 212 are also implemented in creators 240-242 in the platform-specific implementations to instantiate the objects in the corresponding platforms.

For example, object-creation interface 212 may include the following representation:

```
public interface StdFactory {
    StdLong createLong(long value);
    StdBoolean createBoolean(boolean value);
    StdString createString(String value);
    StdArray createArray(StdType stdType);
    StdMap createMap(StdType stdType);
    StdStruct createStruct(List<String> fieldNames, List<StdType> fieldTypes);
    StdStruct createStruct(List<StdType> fieldTypes);
    StdType createStdType(String typeSignature);
}
```

The above interface has a name of "StdFactory" and includes a set of standard methods for creating standard objects of standard types from one or more input values. The standard types may represent primitive types such as longs, booleans, and strings, as well as container types such as arrays, maps, and structs. The representation also includes a method for creating a standard type from a string containing a "typeSignature."

An Apache Hive implementation of the "StdFactory" interface may include the following representation:

```
public class BoundVariables {
    final Map<GenericTypeSignatureElement, ObjectInspector>
        _boundVariables;
    public BoundVariables( ) {...}
```

-continued

```
    public void bind(GenericTypeSignatureElement
        genericTypeSignatureElement, ObjectInspector objectInspector)
        {...}
    public void bind(TypeSignature typeSignature, ObjectInspector
        objectInspector) {...}
    public ObjectInspector getBinding(TypeSignature typeSignature) {...}
}
```

The representation above includes a class named "BoundVariables" that is used to track concrete types to which generic variables map. The class is also used to create objects that map to a specific type signature 214, which is used by the "StdFactory.createStdType" method to return standard types from type signatures that are resolved at runtime (e.g., query compilation time).

To create the objects, the class includes two "bind" methods to bind representations of type signature 214 for the objects to concrete Hive types. For example, the class may match a string-based type signature 214 of "map(K, V)" to a Hive object inspector of type "MapObjectInspector(ArrayObjectInspector(StringObjectInspector), ArrayObjectInspector(LongObjectInspector))" at runtime to bind "K" to "ArrayObjectInspector(StringObjectInspector)" and "V" to "ArrayObjectInspector(LongObjectInspector)."

In particular, a first "bind" method in "Bound Variables" binds a generic type signature element to a Hive "ObjectInspector" and verifies a lack of conflict in the binding. For example, the method may verify that a type signature that includes two arguments of type "array(K)" and "K" is bound to the same type for both instances of "K." A second "bind" method in "Bound Variables" binds an entire type signature 214 of a UDF to actual types received by the UDF at runtime. The second "bind" method may recursively match a tree-based representation of type signature 214 to a tree-based representation of an input (e.g., runtime) type until generic leaf nodes in the type signature are reached. The leaf nodes may then be matched to remaining sub-trees in the input type. If the two trees do not match, the method outputs an error.

Finally, the class includes a "getBinding" method that returns a Hive "ObjectInspector" for a given type signature 214 by recursively constructing "ObjectInspector" objects for nodes 216 of type signature 214. If a node represents a concrete type, the method creates an equivalent "ObjectInspector" object. If the node represents a generic type, the method uses the "_boundVariables" map to determine a type to which the generic type maps to at runtime.

A Presto implementation of the "StdFactory" interface may include the following representation:

```
_keyType = mapType.getKeyType( );
_keyEqualsMethod = ((PrestoStdFactory) stdFactory).
    getFunctionRegistry( ).getScalarFunctionImplementation(
        internalOperator(OperatorType.EQUAL, BooleanType.BOOLEAN,
        ImmutableList.of(_keyType, _keyType))).getMethodHandle( );
```

The above representation is used to obtain a method handle for a "PrestoMap" constructor, which in turn is used with the "createMap" method in the "StdFactory" interface to obtain a key equality method that compares map keys of a generic type for "PrestoMap."

To allow UDF 202 to be defined and used in a platform-independent way, standard UDF interface 108 includes a set of base configurations 218 from which UDF 202 can be created. For example, base configurations 218 may include the following representation:

```
public abstract class StdUDF {
    protected final StdFactory _stdFactory;
    public StdUDF(StdFactory stdFactory) {
        _stdFactory = stdFactory;
    }
    public void init( ) {
    }
    public void processRequiredFiles(String[ ] localFiles) {
    }
    public boolean[ ] getNullableArguments( ) {
        return new boolean[numberOfArguments( )];
    }
    protected abstract int numberOfArguments( );
}
```

Continuing with the previous example, base configurations 218 may also include the following representation:

```
public abstract class StdUDF2<I1 extends StdData, I2 extends StdData, O
extends StdData> extends StdUDF {
    public StdUDF(StdFactory stdFactory) {
        super(stdFactory);
    }
    public abstract O eval(I1 arg1, I2 arg2);
    public String[ ] getRequiredFiles(I1 arg1, I2 arg2) {
        return new String[ ]{ };
    }
    protected final int numberOfArguments( ) {
        return 2;
    }
}
``` of the UDF. All three parameters extend the "StdData" interface. In turn, an "eval" method for executing the UDF has a signature of "public abstract O eval(I1 arg1, I2 arg2)." Implementations of "StdUDF2" are provided "StdData" objects, return "StdData" objects, and use the "StdFactory" to instantiate the "StdData" objects.

Both classes include a method for instantiating an implementation of object-creation interface 212 (e.g., "StdFactory _stdFactory"). The classes also expose two methods for accessing and processing files from a distributed filesystem and/or another data store: "getRequiredFiles" and "processRequiredFiles." The "getRequiredFiles" method may return a list of files for localization, and "processRequiredFiles" may obtain a list of paths of the localized files and use the paths to process the localized files before subsequent execution of the UDF's "eval" method.

Base configurations 218 may additionally allow UDFs to be defined with nullable arguments, or arguments that can receive a null value. When an argument is declared nullable, the UDF may include logic for handling a null value of the argument. If an argument is not nullable, the UDF may return null by default when the argument is null. In turn, the "StdUDF" class includes a "getNullableArguments" method that returns an array of Boolean values, with each element in the array indicating whether or not the corresponding argument of the UDF is nullable.

Continuing with the previous example, UDF 202 may include the following representation:

```
public class MapFromTwoArraysFunction extends
    StdUDF2<StdArray,StdArray,StdMap> {
    final static public List<String> INPUT_PARAMETER_SIGNATURES =
        ImmutableList.of("array(K)", "array(V)" );
    final static public String OUTPUT_PARAMETER_SIGNATURE = "map(K,V)";
    public MapFromTwoArraysFunction(StdFactory stdFactory) {
        super(stdFactory);
    }
    @Override
    public StdMap eval(StdArray a1, StdArray a2) {
        if (a1.size() != a2.size()) {
            return null;
        }
        StdMap map = _stdFactory.createMap(_platform.createStdType(
            OUTPUT_PARAMETER_SIGNATURE));
        for (int i = 0; i < a1.size(); i++) {
            map.put(a1.get(i), a2.get(i));
        }
        return map;
    }
}
```

The above representations include two abstract classes named "StdUDF" and "StdUDF2." The "StdUDF2" class extends the "StdUDF" class and represents a UDF with two arguments. Additional sub-classes of the "StdUDF" class may be created to represent UDFs with other numbers of arguments (e.g., as "StdUDF0," "StdUDF1," "StdUDF3," etc.). In turn, each sub-class may be type parameterized by (i+1) type parameters, with i input type parameters and one output type parameter. All types used as input or output of the UDF may be required to extend the "StdData" interface. A "numberOfArguments" method in each class may be used to obtain the number of arguments accepted by a UDF that is derived from the class.

The "StdUDF2" class is parameterized by three parameters named "I1," "I2," and "O." "I1" and "I2" represent input types of the UDF, and "O" represents the output type The representation above includes a class with a name of "MapFromTwoArraysFunction" that extends the "StdUDF2" abstract class. The class is parameterized by three types of "StdArray," "StdArray," and "StdMap." The first two types represent input types of UDF 202, and the last type represents an output type of UDF 202.

The class includes an input type signature 214 ("INPUT_PARAMETER_SIGNATURES") as a list containing two strings of "array(K)" and "array(V)" and an output type signature 214 ("OUTPUT_PARAMETER_SIGNATURES") as a string of "map(K,V)." A constructor for the class initializes a "StdFactory" for instantiating standard objects within UDF 202.

The class also includes an "eval" function that implements the logic of UDF 202. The "eval" function first verifies that two "StdArray" objects named "a1" and "a2"

are of the same size and returns with a null value if the objects have different sizes. Next, the "eval" function creates a "StdMap" object named "map" using the output type signature 214. The eval function then populates "map" with matched pairs of values from "a1" and "a2," with the value from "a1" acting as a key in a map and the value from "a2" acting as the corresponding value in the map. Finally, the eval function returns with "map."

To allow a platform-independent UDF 202 to be executed on individual platforms, the system of FIG. 2 generates and/or provides platform-specific wrappers (e.g., wrapper 1 224, wrapper x 226) for UDF 202. For example, the system may include a mechanism that automatically generates one or more platform-specific wrappers for UDF 202. After UDF 202 is created and verified to conform to requirements associated with standard UDF interface 108, the mechanism may parse UDF 202 and use a set of platform-specific rules and/or parameters to produce a platform-specific wrapper for each platform in which UDF 202 is to be executed.

Each platform-specific wrapper converts between a standard structure 238 of data in UDF 202 and a platform-specific structure (e.g., structures 234-236) of the data in a corresponding platform. The wrapper also calls UDF 202 to perform operations 228 on the data. The wrapper may further provide additional functionality, such as verifying runtime type signatures using a specified type signature 214 from UDF 202, deriving an output type of UDF 202, handling nullable and non-nullable arguments associated with UDF 202, and/or accessing and processing files from a distributed filesystem and/or other type of data store.

For example, UDF 202 may be executed by calling a platform-specific wrapper for UDF 202 from a corresponding platform. The wrapper may convert data passed to the wrapper from a platform-specific structure associated with the platform into a standard structure 238 that is supported by standard UDF interface 108, such as a set of standard objects and/or types associated with standard data interface 208 and standard type interface 210. Next, the wrapper may call UDF 202 and pass data in the standard structure 238 to UDF 202, and UDF 202 may perform one or more operations 228 using the passed data. The wrapper may then obtain output data in the standard structure 238 from UDF 202 and convert the output data into the platform-specific structure of the platform before returning the output data to the platform and/or otherwise using the output data with the platform.

A Presto implementation of a wrapper for the "MapFromTwoArraysFunction" UDF above may include the following representation:

```
public class MapFromTwoArraysFunctionWrapper extends SqlScalarFunction {
    public static final MapFromTwoArraysFunctionWrapper
        MAP_FROM_TWO_ARRAYS_FUNCTION_WRAPPER =
        new MapFromTwoArraysFunctionWrapper( );
    MapFromTwoArraysFunction _stdUdf;
    protected MapFromTwoArraysFunctionWrapper( ) {
        super(new Signature("map_from_two_arrays", FunctionKind.SCALAR,
            ImmutableList.of(typeVariable("K"), typeVariable("V")),
            ImmutableList.of( ),
            parseTypeSignature(
                MapFromTwoArraysFunction.OUTPUT_PARAMETER_SIGNATURE),
                MapFromTwoArraysFunction.INPUT_PARAMETER_SIGNATURES.
            stream( ).map(signature -> parseTypeSignature(signature)).
            collect(Collectors.toList( )),
        false));
    }
    @Override
    public boolean isHidden( ) {
        return false;
    }
    @Override
    public boolean isDeterministic( ) {
        return true;
    }
    @Override
    public String getDescription( ) {
        return "Create a map out of two arrays.";
    }
    @Override
    public ScalarFunctionImplementation specialize(BoundVariables
        boundVariables, int arity, TypeManager typeManager, FunctionRegistry
        functionRegistry) {
        Type array1Type = typeManager.getType(applyBoundVariables(
            TypeSignature.parseTypeSignature(MapFromTwoArraysFunction.
                INPUT_PARAMETER_SIGNATURES.get(0)), boundVariables));
        Type array2Type = typeManager.getType(applyBoundVariables(
            TypeSignature.parseTypeSignature(MapFromTwoArraysFunction.
                INPUT_PARAMETER_SIGNATURES.get(1)), boundVariables));
        MethodHandle methodHandle = methodHandle(
            MapFromTwoArraysFunctionWrapper.class,
            "mapFromTwoArrays",
            StdFactory.class,
            Type.class,
            Type.class,
            Block.class,
            Block.class
        );
        StdFactory stdFactory = new PrestoStdFactory(boundVariables,
            typeManager, function Registry);
```

```
      _stdUdf = new MapFromTwoArraysFunction(stdFactory);
      methodHandle = methodHandle.bindTo(this).bindTo(stdFactory).
         bindTo(array1Type).bindTo(array2Type);
      boolean[ ] nullableArguments = _stdUdf.getAndCheckNullableArguments( );
      return new ScalarFunctionImplementation(true,
         IntStream.range(0, nullableArguments.length).
         mapToObj(idx -> nullableArguments[idx]).collect(Collectors.toList( )),
         methodHandle, isDeterministic( ));
   }
   @UsedByGeneratedCode
   public Block mapFromTwoArrays(StdFactory stdFactory, Type array1Type,
      Type array2Type, Block array1, Block array2) {
      PrestoArray stdArray1 = (PrestoArray)
         PrestoWrapper.createStdData(array1, array1Type, stdFactory);
      PrestoArray stdArray2 = (PrestoArray)
         PrestoWrapper.createStdData(array2, array2Type, stdFactory);
      StdMap stdMap = _stdUdf.eyal(stdArray1, stdArray2);
      return stdMap == null? null : (Block) stdMap.getUnderlyingData( );
   }
}
```

The representation above includes a class named "MapFromTwoArraysFunctionWrapper" that extends a "SqlScalarFunction" class representing a Presto scalar UDF. A constructor for the class calls a constructor for the superclass using parameters associated with type signature 214 for the UDF. A "specialize" method in the class is used to bind type signature 214 to runtime Presto types. A "mapFromTwoArrays" method converts platform-specific "PrestoArray" objects into standard objects before calling the "eval" method in the "MapFromTwoArraysFunction" class using the standard objects as arguments. The method then returns with a Presto-specific "Block" representation of underlying data from a "StdMap" object returned by the "eval" method.

A Hive implementation of a wrapper for the "MapFromTwoArraysFunction" UDF above may include the following representation:

```
public abstract class GenericStdUdfWrapper extends GenericUDF {
   ObjectInspector[ ] _inputObjectInspectors;
   StdFactory _std Factory;
   StdUDF _stdUdf;
   public static List<String> INPUT_PARAMETER_SIGNATURES;
   @Override
   public ObjectInspector initialize(ObjectInspector[ ] arguments) throws
      UDFArgumentException {
      BoundVariables boundVariables = new BoundVariables( );
      List<String> inputTypeSignatures = getInputParameterSignatures( );
      if (inputTypeSignatures.size( ) != arguments.length) {
      throw new RuntimeException("Function " +
      this.getClass( ).getAnnotation(Description.class).name( ) + " expects "
      + inputTypeSignatures.size( ) + " parameters. Found " + arguments.length
      + " parameters.");
      }
      _inputObjectInspectors = new ObjectInspector[arguments.length];
      for (int i = 0; i < inputTypeSignatures.size( ); i++) {
         boundVariables.bind(TypeSignature.parse(inputTypeSignatures.get(i)),
            arguments[i]);
         _inputObjectInspectors[i] = arguments[i];
      }
      _stdFactory = new HiveStdFactory(boundVariables);
      _stdUdf = getStdUdf( );
      ObjectInspector outputObjectInspector = ((HiveStdFactory)
         _stdFactory).createObjectInspector(
         TypeSignature.parse(getOutputParameterSignature( )));
      return outputObjectInspector;
   }
   protected abstract StdUDF getStdUdf( );
   protected abstract List<String> getInputParameterSignatures( );
   protected abstract String getOutputParameterSignature( );
}
@Description(name = "map_from_two_arrays")
public class MapFromTwoArraysFunctionWrapper extends
   GenericStdUdfWrapper {
   @Override
   public Object evaluate(DeferredObject[ ] arguments) throws HiveException {
      for (int i = 0; i < arguments.length; i++) {
         if (arguments[i].get( ) == null && !_stdUdf.getNullableArguments( )[1]) {
            return null;
         }
      }
      StdArray arg1 = (StdArray) HiveWrapper.createStdData(arguments[0].get( ),
         _inputObjectInspectors[0]);
```

```
    StdArray arg2 = (StdArray) HiveWrapper.createStdData(arguments[1].get( ),
       _inputObjectInspectors[1]);
    StdData stdResult = ((StdUDF2) _stdUdf).eval(arg1, arg2);
    return stdResult == null? null : stdResult.getUnderlyingData( );
  }
  @Override
  public String getDisplayString(String[ ] children) {
    return getStandardDisplayString("map_from_two_arrays", children);
  }
  @Override
  protected StdUDF getStdUdf( ) {
    return new MapFromTwoArraysFunction(_stdFactory);
  }
  @Override
  protected List<String> getInputParameterSignatures( ) {
    return MapFromTwoArraysFunction.INPUT_PARAMETER_SIGNATURES;
  }
  @Override
  protected String getOutputParameterSignature( ) {
    return MapFromTwoArraysFunction.OUTPUT_PARAMETER_SIGNATURE;
  }
}
```

The above representation includes an abstract class named "GenericStdUdfWrapper" that extends a "GenericUDF" class representing a generic UDF in Hive. An "initialize" method in the "GenericStdUdfWrapper" class is used to bind type signature 214 for the UDF to runtime Hive types.

The above representation also includes a "MapFromTwoArraysFunctionWrapper" class that extends the "GenericStdUdfWrapper." The "MapFromTwoArraysFunctionWrapper" class includes a "getStdUdf" method that returns a new "MapFromTwoArraysFunction" object, a "getInputParameterSignature" method that returns an input type signature 214 for the "MapFromTwoArraysFunction" object, and a "getOutputParmaeterSIgnature" method that returns an output type signature 214 for the "MapFromTwoArraysFunction" object.

The "MapFromTwoArraysFunctionWrapper" class also includes an "evaluate" method that converts Hive-specific objects passed as arguments into the method into two "StdArray" objects named "arg1" and "arg2." Next, the "evaluate" method passes "arg1" and "arg2" to an "eval" method in the "MapFromTwoArraysFunction" object and obtains a "StdData" object named "stdResult" containing output from the "eval" method. Finally, the "evaluate" method returns underlying data from "stdResult."

By using standard UDF interface 108 to define UDFs (e.g., UDF 202) and providing platform-specific implementations of data 220-222, types 230-232, creators 240-242, and/or wrappers associated with standard UDF interface 108, the system of FIG. 2 may allow the functionality of a UDF to be used with multiple platforms. Users may thus use standard UDF interface 108 to produce one standard version of each UDF instead of manually re-implementing the UDF on each platform in which the UDF is to be used. Consequently, the system may improve the execution and use of computer systems, applications, and/or technologies for querying, transforming, and/or accessing data and/or using UDFs to perform data querying, transformation, and/or access.

Figure 3:
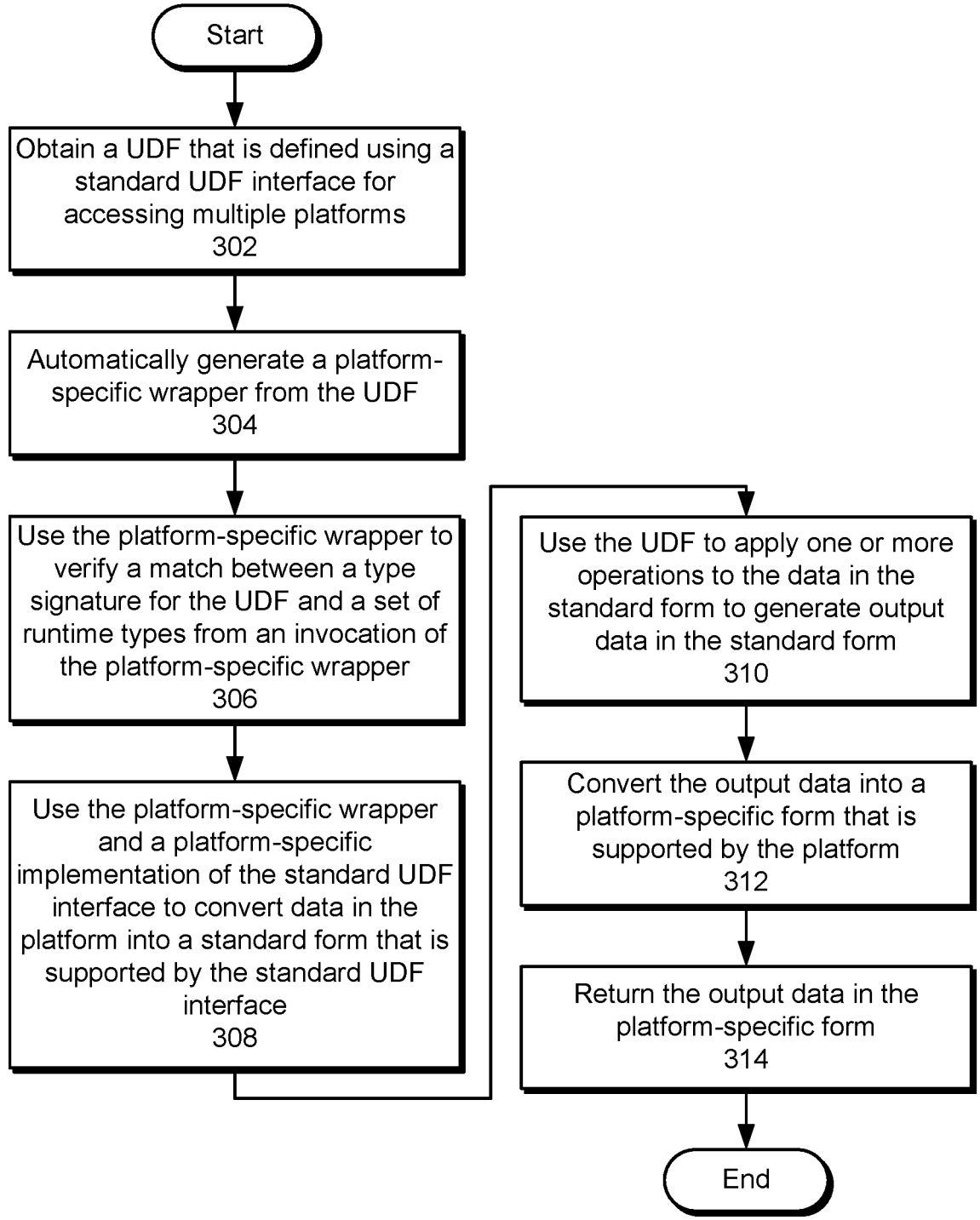
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a UDF that is defined using a standard UDF interface for accessing multiple platforms is obtained (operation 302). The standard UDF interface may include a standard data interface, a standard type interface, and/or an object-creation interface. The standard data interface may be extended by a first set of interfaces for accessing standard data objects, and the standard type interface may be extended by a second set of interfaces for accessing schemas associated with the standard data objects. For example, the standard data interface and standard type interface may be extended by interfaces associated with integers, Booleans, longs, arrays, maps, and/or structs. The object-creation interface may include a set of standard methods for creating standard types and/or objects from one or more input values. As a result, the functionality of the UDF may be specified with respect to the standard objects, types, and/or methods.

Next, a platform-specific wrapper is automatically generated from the UDF (operation 304). For example, the UDF may be parsed, and a set of platform-specific rules and/or parameters may be used to generate code for the platform-specific wrapper from the UDF for a given platform in which the UDF is to execute.

The platform-specific wrapper is also used to verify a match between a type signature for the UDF and a set of runtime types from an invocation of the platform-specific wrapper (operation 306). For example, the UDF may be executed on the platform by calling the platform-specific wrapper with a set of arguments. The platform-specific wrapper may obtain a set of platform-specific runtime types from the arguments and verify that the runtime types can be used with the type signature for the UDF. To perform such verification, the platform-specific wrapper may obtain the type signature of the UDF as a tree-based structure with a set of nodes. Each node may be associated with a concrete, generic, parametric, and/or non-parametric type. The platform-specific wrapper may recursively match each node in the type signature with a tree containing the runtime types until generic leaf nodes in the type signature are reached. If the two trees do not match, the platform-specific wrapper may return an error. If the two trees match, the platform-specific wrapper may bind each node in the type signature to a corresponding runtime type on the platform.

The platform-specific wrapper and a platform-specific implementation of the standard UDF interface are then used to convert data in the platform into a standard form that is supported by the standard UDF interface (operation 308). For example, the platform-specific wrapper may use the platform-specific implementation to obtain the data from one or more platform-specific objects and/or types and wrap the data in standard objects and/or types supported by the standard UDF interface.

The UDF is then used to apply one or more operations to the data in the standard form to generate output data in the standard form (operation 310). For example, the UDF may be called by the platform-specific wrapper, and the data may be passed in the standard form to the UDF. The UDF may then manipulate the data to produce output data that is returned using one or more standard objects and/or types.

In turn, the output data is converted into a platform-specific form that is supported by the platform (operation 312). For example, the platform-specific wrapper may obtain the output data from the UDF and use the platform-specific implementation of the standard UDF interface to convert the output data from the standard form into one or more platform-specific objects and/or types that are supported by the platform.

Finally, the output data is returned in the platform-specific form (operation 314). For example, the outputted data may be returned by the platform-specific wrapper, stored in the platform, displayed within the platform, and/or otherwise used with the platform.

Figure 4:
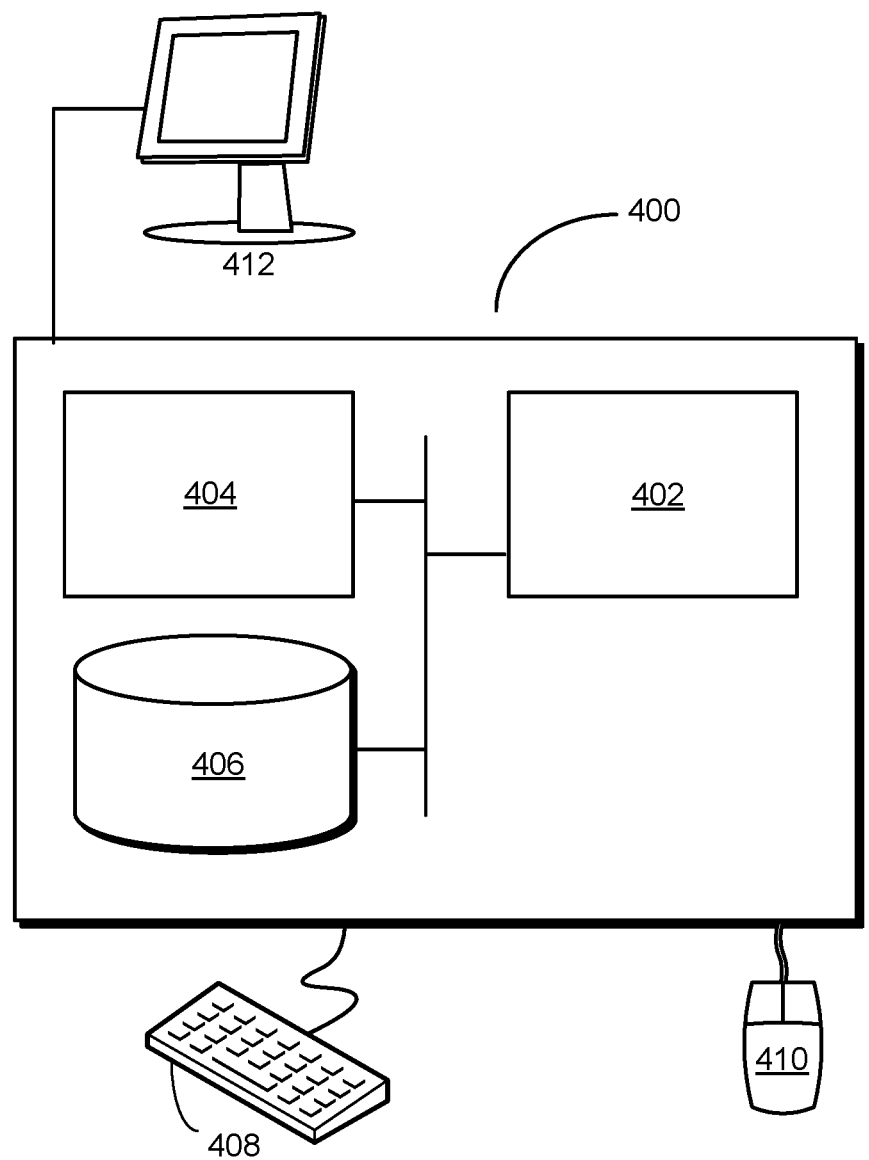
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system provides a standard UDF interface for accessing multiple platforms and/or a mechanism for automatically generating a platform-specific wrapper from a UDF. The system obtains a user-defined function (UDF) that is defined using the standard UDF interface. Next, the system converts data in a platform into a standard form that is supported by the standard UDF interface using a platform-specific wrapper for the UDF and a platform-specific implementation of the standard UDF interface. The system then generates output data in the standard form by applying one or more operations to the data in the standard form. Finally, the system converts the output data into a platform-specific form that is supported by the platform and returns the output data in the platform-specific form.

In addition, one or more components of computer system 400 may be remotely located and connected to the other components over a network. Portions of the present embodiments (e.g., data-processing system, standard UDF interface, UDF, platform-specific implementations, wrappers, etc.) may also be located on different nodes of a distributed system that implements the embodiments. For example, the present embodiments may be implemented using a cloud computing system that executes a set of generic UDFs on a set of remote platforms.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining a user-defined function (UDF) that is defined using a standard UDF interface for accessing multiple platforms;
    using a platform-specific wrapper for the UDF to verify a match between a type signature for the UDF and a set of runtime types from an invocation of the platform-specific wrapper;
    converting, by a computer system, data in a platform into a standard form that is supported by the standard UDF interface using the platform-specific wrapper and a platform-specific implementation of the standard UDF interface;
    generating, by the computer system, output data in the standard form by applying one or more operations to the data in the standard form;
    converting, by the computer system, the output data into a platform-specific form that is supported by the platform; and
    returning the output data in the platform-specific form.

2. The method of claim 1, wherein using the UDF to perform the one or more operations using the standard form to obtain output data from the UDF comprises:
    calling the UDF from the platform-specific wrapper.

3. The method of claim 1, further comprising:
    automatically generating the platform-specific wrapper from the UDF.

4. The method of claim 1, wherein the type signature comprises a set of nodes in a tree structure.

5. The method of claim 4, wherein each node in the set of nodes is associated with at least one of:
    a concrete type;
    a generic type;
    a parametric type; and
    a non-parametric type.

6. The method of claim 1, wherein the standard UDF interface comprises:
    a standard data interface; and
    a standard type interface.

7. The method of claim 6, wherein the standard data interface is extended by a first set of interfaces for accessing standard data objects.

8. The method of claim 7, wherein the standard type interface is extended by a second set of interfaces for accessing schemas associated with the standard data objects.

9. The method of claim 6, wherein the standard UDF interface further comprises a standard object-creation interface.

10. The method of claim 9, wherein the standard object-creation interface comprises a method that creates a standard type from one or more input values.

11. A system, comprising:
one or more processors; and
memory storing instructions that, when executed by the one or more processors, cause the system to:
- obtain a user-defined function (UDF) that is defined using a standard UDF interface for accessing multiple platforms;
- use a platform-specific wrapper for the UDF to verify a match between a type signature for the UDF and a set of runtime types from an invocation of the platform-specific wrapper;
- convert data in a platform into a standard form that is supported by the standard UDF interface using the platform-specific wrapper and a platform-specific implementation of the standard UDF interface;
- generate output data in the standard form by applying one or more operations to the data in the standard form;
- convert the output data into a platform-specific form that is supported by the platform; and
- return the output data in the platform-specific form.

12. The system of claim 11, wherein the memory further stores instructions that, when executed by the one or more processors, cause the system to:
- automatically generate the platform-specific wrapper from the UDF.

13. The system of claim 11, wherein the standard UDF interface comprises:
- a standard data interface; and
- a standard type interface.

14. The system of claim 13, wherein the standard data interface is extended by a first set of interfaces for accessing standard data objects.

15. The system of claim 14, wherein the standard type interface is extended by a second set of interfaces for accessing schemas associated with the standard data objects.

16. The system of claim 13, wherein the standard UDF interface further comprises a standard object-creation interface.

17. A non-transitory computer-readable storage medium storing instructions that when executed by a computer cause the computer to perform a method, the method comprising:
- obtaining a user-defined function (UDF) that is defined using a standard UDF interface for accessing multiple platforms;
- using a platform-specific wrapper for the UDF to verify a match between a type signature for the UDF and a set of runtime types from an invocation of the platform-specific wrapper;
- converting data in a platform into a standard form that is supported by the standard UDF interface using the platform-specific wrapper and a platform-specific implementation of the standard UDF interface;
- generating output data in the standard form by applying one or more operations to the data in the standard form;
- converting the output data into a platform-specific form that is supported by the platform; and
- returning the output data in the platform-specific form.

18. The non-transitory computer-readable storage medium of claim 17, wherein the method further comprises:
- automatically generating the platform-specific wrapper from the UDF.

19. The non-transitory computer-readable storage medium of claim 17, wherein the standard UDF interface comprises:
- a standard data interface; and
- a standard type interface.

20. The non-transitory computer-readable storage medium of claim 19, wherein the standard data interface is extended by a first set of interfaces for accessing standard data objects.

* * * * *